United States Patent [19]

Alberts, Jr.

[11] 4,424,511

[45] Jan. 3, 1984

[54] NOISE MONITOR

[76] Inventor: Fred L. Alberts, Jr., 3500 Hardy St., Apt. 56, Hattiesburg, Miss. 39401

[21] Appl. No.: 202,353

[22] Filed: Oct. 30, 1980

[51] Int. Cl.³ .................... G08B 23/00; H04Q 1/00
[52] U.S. Cl. .................... 73/646; 340/815.11; 340/500; 367/198; 434/185; 381/56; 381/57
[58] Field of Search ............... 340/500, 148, 32, 573, 340/815.11; 179/1 VL, 1 P, 1 VC, 1 N, 1 MN, 1 VE; 73/646, 647; 434/185; 235/92 AE, 92 MT; 367/197–198

[56] References Cited

U.S. PATENT DOCUMENTS

| | | | |
|---|---|---|---|
| 3,144,519 | 8/1964 | Herbig et al. | 73/646 |
| 3,304,368 | 2/1967 | Ford et al. | 179/1 N |
| 3,440,349 | 4/1969 | Gibbs | 179/1 N |
| 3,480,912 | 11/1969 | Speeth et al. | 340/148 |
| 3,582,671 | 6/1971 | Ott | 340/148 |
| 3,615,162 | 10/1971 | Barber | 73/647 |
| 3,769,844 | 11/1973 | Skoures | 235/92 AE |
| 3,797,012 | 3/1974 | Gibbs et al. | 340/148 |

OTHER PUBLICATIONS

"Lunchroom Traffic Lights", The Tampa Tribune, Section B, p. 1B, 12-27-80.

Primary Examiner—Donnie L. Crosland
Attorney, Agent, or Firm—Irvin A. Lavine

[57] ABSTRACT

A noise level monitoring and indicating system includes plural microphones distributed about a classroom, bus, etc. and adapted to drive individual counters to indicate the number of times a minimum sound level has been exceeded by the signal from the associated microphone. Visual indicators are also provided to indicate the instantaneous noise status at selected microphones.

9 Claims, 4 Drawing Figures

NOISE MONITOR

TECHNICAL FIELD

This invention relates to a means to simultaneously monitor the noise level at a plurality of locations and provide a visual indication related to the noise level at individual stations and the cumulative level of all stations. The system also records the number of times the noise level exceeds a predetermined volume at individual stations for a predetermined period of time.

STATEMENT OF INDUSTRIAL APPLICATION

Educators, noise pollution control agencies and sectors of the entertainment industry need to monitor the noise level at a plurality of stations and determine the level at each station as well as the cumulative noise level of all stations. This type of data is required for reward and punishm programs in schools, buses, or large assemblies of people when it is desirous to attempt to combat the noise problem with a competitive program. This type of data is also useful in entertainment competitive programs wherein the reaction of an audience is to be monitored to judge the performance of an entertainer.

BACKGROUND OF PRIOR ART

Numerous systems have been developed for monitoring noise levels and providing an indication of the measurement. For instance, Gibbs in U.S. Pat. No. 3,440,349 and Gibbs et al in U.S. Pat. No. 3,797,012 provide noise level indicator systems wherein a microphone detects the ambient noise level and an electronic noise circuit controls a plurality of lamps in response to the volume of noise detected by the microphone whereby an indication of an acceptable noise level or unacceptable noise level is provided.

Ford et al in U.S. Pat. No. 3,304,368 is another example of prior art systems where a means is provided to indicate when the noise level within a school bus exceeds a predetermined value and Ott in U.S. Pat. No. 3,582,671 provides a visual indication when the noise level in a study room or library exceeds a predetermined level.

Speeth et al in U.S. Pat. No. 3,480,912 presents a system which incorporates a plurality of lamps that are sequentially illuminated in accordance with the noise level detected by a microphone. This system is used to tell shy students who are speaking that they are speaking at a level which is too low, suitable or too high.

While many systems have been devised to determine noise levels and provide a qualitative indication of the instantaneous noise levels, no system has been developed to date which will provide instantaneous quantitative noise level data for a plurality of stations individually and jointly or provide an indication of the number of occurrences of noise levels exceeding predetermined values.

OBJECTIVES OF THE INVENTION

In view of the preceding, it is a primary objective of the present invention to provide a system which will simultaneously monitor noise levels at a plurality of stations and provide an indication as to the acceptability of the noise level at individual stations as well as the acceptability of the joint noise levels from all stations.

A further objective of the present invention is to provide a means to record the number of incidences of noise levels exceeding a predetermined value.

A still further objective of the present invention is to provide means to individually record the number of times noise levels exceed predetermined values at a plurality of stations.

The preceding objectives of this invention and other objectives will become apparent in light of the specification and illustrations presented hereby.

BRIEF SUMMARY OF THE INVENTION

A plurality of voice operated relays having independent microphone inputs are each responsive to a different portion of an area being monitored. When a voice operated relay senses a noise level above its operating threshold, it increments a counter and activates a relay. The relay controls an external reinforcement device such as an indicator lamp signifying that the predetermined maximum noise level has been exceeded.

The audio signal detected by each of the voice operated relays is coupled to an additional voice operated relay which includes counter and relay output means similar to those in the individual channels described above. This additional voice operated relay functions as a summing means for the noise levels sensed throughout the area by all of the microphones.

Each voice operated relay also provides an output via a sensor selector switch and audio amplifier to a decibel meter, monitor speaker and optional remote monitors.

DETAILED DESCRIPTION OF THE INVENTION

Figure 1:
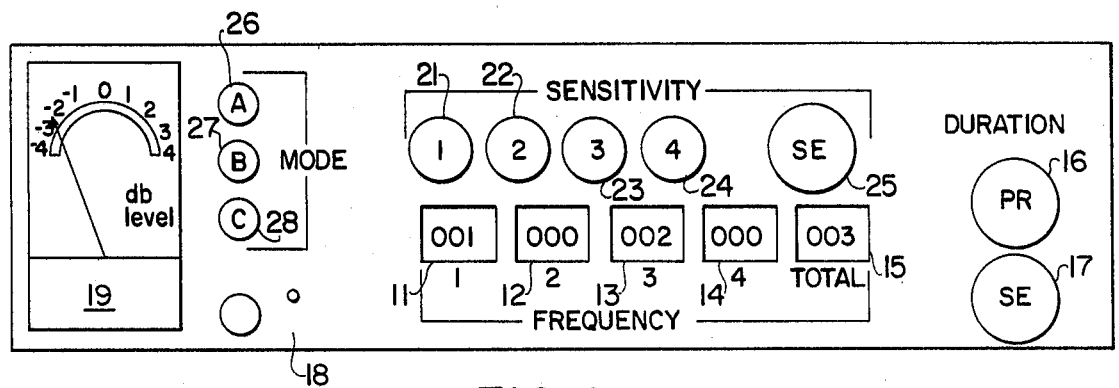
FIG. 1 is a front view of the noise monitoring system.

FIG. 1 is a front view of a typical noise level monitor constructed in accordance with the teachings of this patent. It is comprised of a panel which houses the indicator and control elements of the system. The embodiment illustrated is for a system capable of monitoring up to four different zones or areas. This particular size of the system has been selected for explanation purposes only. The actual number of channels may vary in accordance with the requirements of the system user.

The panel includes five counters with counters 11 through 14 each serving an individual voice operated relay wherein they are incremented when their associated voice operated relay senses a noise volume in its monitoring zone which exceeds a predetermined value. Counter 15 is incremented by the total area voice operated relay channel and thus it registers each time the sum of the individual channels exceeds a predetermined value.

In the illustrated embodiment, each channel includes a sensitivity adjustment 21 through 25 which provide a means whereby the activation level of each voice operated relay may be adjusted. Individual adjustments are provided for each channel in the illustrated embodiment so that the channels may be balanced to account for acoustical differences in the various zones they serve. If desired, the sensitivity adjustments 21 through 24 may be ganged on a common shaft so that the individual channels will always maintain a proper relationship with respect to related sensitivities. The total area sensitivity adjustment 25 is maintained separate from the individual zone sensitivity adjustments 21 through 24 to provide a means whereby a system operator may vary what is considered an acceptable combined noise level while maintaining individual zone limits.

To provide a quantitative evaluation of sustained noise levels, each voice operated relay includes a timing means whereby the relay is cycled to cause the associated counter to increment at predetermined constant intervals during a sustained noise level above the set threshold. This duration control for each individual zone is controlled by control knob 16 which simultaneously alters an adjustment means in each zone channel so that the duration in each zone channel will be similar. Duration adjustment 17 controls the time delay for recycling in the total area of the channel.

A series of three mode indicating lights 26, 27 and 28 are provided on the panel to indicate the instantaneous status being detected by the system. Indicator 26 is a red indicator lamp which is caused to illuminate when ever the voice operated relay of an individual zone channel is activated, thus signalling that one of the zones is exceeding the allowable noise level. Indicator 27 provides an orange indication when ever the total area voice operated relay is activated to provide an indication that the cumulative volume of noise from all of the zones exceeds the area limit. Indicator 28 is a green light and it is electrically connected with indicators 26 and 27 to function in a mutually exclusive fashion with respect to those two indicators so that as long as indicators 26 and 27 are extinguished, indicator 28 will be illuminated to provide a visual indication that noise levels within the individual zones and in the total area are within acceptable limits.

Selector switch 18 is a five step rotary switch which couples from a selected voice operated relay, a voltage level which is a function of the volume of noise detected by the selected zone microphone in positions 1 through 4 or a voltage level representing a function of the sum of the noise detected by all of the individual zone channel microphones to the decibel level indicator 19, a monitor speaker, and to an output jack to which remote monitors may be connected.

Figure 2:
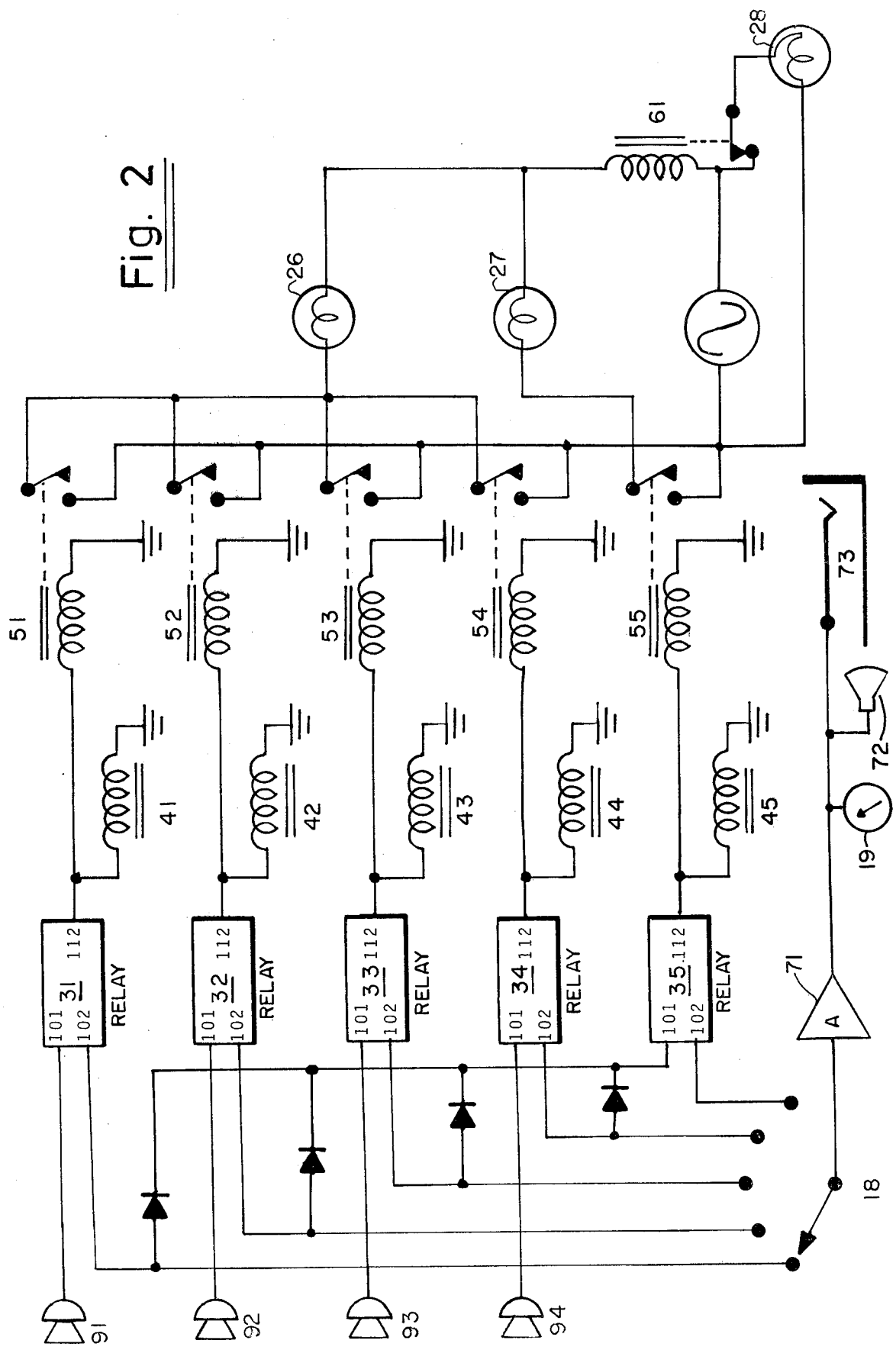
FIG. 2 is a schematic diagram of the noise monitoring system.

In the schematic diagram of FIG. 2, voice operated relays 31 through 34 monitor individual zones via their associated microphones 91 through 94 and the area voice operated relay 35 sums a voltage function from each of the zone voice operated relays 31 through 34. This function may be more clearly visualized by referring to FIG. 3 which presents a schematic diagram of a typical voice operated relay 31 through 35.

Figure 3:
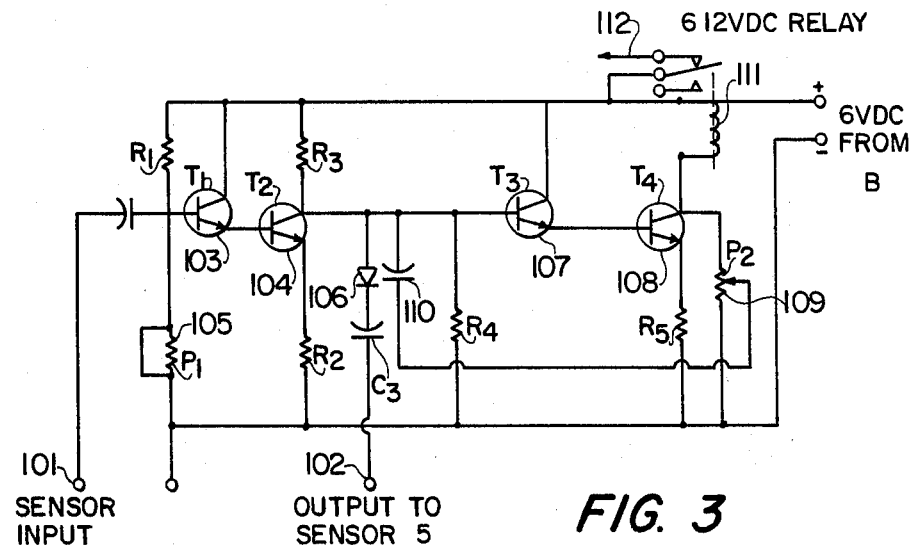
FIG. 3 is a schematic diagram of one of the voice operated relays indicated by a symbolic box in FIG. 2.

The sensor input 101 of FIG. 3 is connected to an individual associated microphone in each of the voice operated relays 31 through 34 of FIG. 2 and in the case of voice operated relay 35, sensor input 101 of FIG. 3 is coupled to sensor output 102 of each of the voice operated relays 31 through 34. Thus all five voice operated relay circuits function in identical manner except the total area voice operated relay receives its input from an amplified noise level signal derived by each of the individual zone voice operated relays while the individual zone operated relays receive their input from an individual associated microphone.

Considering the individual voice operated relay circuitry in detail, the voltage level applied to sensor input 101 is capacitively coupled to an audio amplifier comprised of transistors 103 and 104. The gain of this amplification stage is controlled by potentiometer 105 which is adjusted by one of the sensitivity adjustment control knobs 21 through 25 of FIG. 5, depending upon which channel the particular voice operated relay is functioning in. The amplified audio signal is coupled via an isolating diode 106 to the sensor output 102 which, as can be seen in FIG. 2, is coupled to the sensor selector switch 18 and in the case of individual zone voice operated relays to the input of the area voice operated relay. The output of transistor 104 is also coupled to the input of the relay control amplifier which in the illustrated embodiment is comprised of transistors 107 and 108. An RC feedback path comprised of a potentiometer 109 and capacitor 110 is incorporated in the relay control amplifier circuitry. This feedback provides an RC time constant which biases the amplifier off after a voltage level of a predetermined magnitude has been applied to the input thereof for a predetermined period as controlled by potentiometer 109 which is the duration control device set by the duration control 16 or 17 of FIG. 1. Thus when the voltage level at sensor input 101 exceeds a predetermined value, relay counter amplifier conducts and the current flow through transistor 108 energizes relay 111 and starts capacitor 110 charging. When capacitor 110 has sufficiently charged, transistor 107 is cut off causing transistor 108 to be cut off and relay 111 is deenergized. Capacitor 110 discharges and if the output of transistor 104 is still sufficiently high, the relay control amplifier comprised of transistors 107 and 108 begin conducting and relay 111 is again energized.

Each time relay 111 of FIG. 3 closes, a positive potential from the system power source is applied to the normally open relay contact 112 which, as can be seen in FIG. 2, causes the associated counter solenoid 41 through 45 to be energized and also energizes an associated reinforcement relay 51 through 55.

Figure 4:
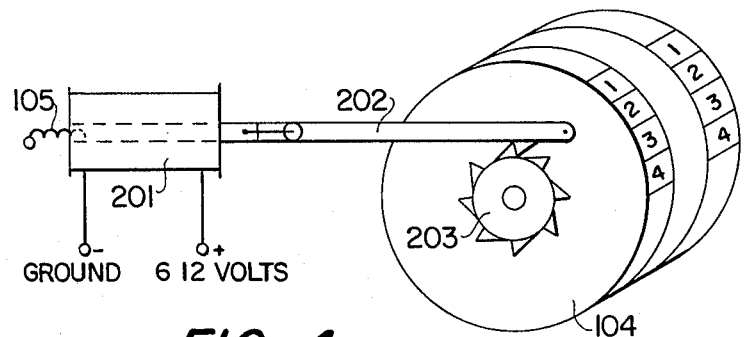
FIG. 4 is a pictorial representation of the solenoid operated counters.

FIG. 4 is a pictorial representation of one of the counters 41 through 45. Note that it includes a solenoid 201 which, when energized via relay 111 pulls arm 202 which rotates ratchet 203 one increment causing the counter display 104 to advance one digit. Counter display 104 may be comprised of a plurality of ganged counter wheels which function in a sequential fashion as is common in the art whereby a complete revolution of one counter wheel causes a single incrementation of the following counter wheel. When solenoid 201 is deenergized by the opening of relay 111, a spring bias means 105 advances on 202 so that it can increment the counter the next time the solenoid is energized.

Relays 51 through 55 are low voltage DC relays which apply an alternating current to indicators 26, 27, and 28 as a function of the status of voice operated relays 31 through 35. The individual zone channel relays 51 through 54 have their outputs connected in parallel to apply an AC current to the red warning indicator 26 of FIG. 1 to indicate that at least one zone is exceeding the allowable noise level. Current flow for indicator 26 is through the energizing coil for relay 61 which, in a deenergized condition couples AC current through the green indicator 28 of FIG. 1. Thus when a path for current is provided through indicator lamp 26 and one of relays 51 through 54, relay 61 is energized extinguishing indicator lamp 28 so that indicator lamps 26 and 28 will function in a mutually exclusive manner. The orange area warning lamp 27 is energized by way of relay 55 and the solenoid for relay 61 so that lamps 27 and 28 will also operate in a mutually exclusive fashion. Thus if warning lamps 26 or 27 are illuminated, the green lamp will be in an off condition.

As can be seen in FIG. 2, the outputs 102 of each of the voice operated relays 31 through 35 are connected to to an individual contact of sensor selector switch 18 and the common contact is applied to an audio amplifier 71 which provides an input to decibel meter 19, monitor speaker 72 and remote monitor output jack 73.

While a preferred embodiment of this invention has been illustrated and described, variations and modifications may be apparent to those skilled in the art. For instance, it is anticipated that relays 111 of the voice operated relay assemblies may be provided by solid state devices such as SCR's. Relays 51 through 55 and 56 may also be replaced by triacs or similar solid state means and counters 41 through 45 can be a combination of electronic registers and display means. Therefore, I do not wish to be limited thereto and ask that the scope and breadth of this invention be determined from the claims which follow rather than the above description.

What I claim is:

1. A noise level monitoring and indicating system, comprising:
   (a) a plurality of voice responsive channels, each including a microphone, an audio amplifier, and switch means for completing an electrical circuit when the amplitude of the output of said audio amplifier exceeds a predetermined value; and an indicator means for each of said plurality of voice responsive channels, said indicator means including a display counter driven by said electrical circuit for providing an indication of the number of times said electrical circuit has been completed in the associated one of said plurality of voice responsive channels;
   (b) an area voice responsive channel, including an audio amplifier and switch means for completing an electrical circuit when the amplitude of the output of said last mentioned audio amplifier exceeds a predetermined value;
   (c) means coupling an output of each of said audio amplifiers from said plurality of voice responsive channels to the input of said area voice responsive channel audio amplifier; and
   an area indicator means responsive to said area voice responsive channel, said area indicating means including a display counter driven by said area responsive channel electrical circuit for providing an indication of the number of times said area voice responsive channel electrical circuit has been completed.

2. A noise level monitoring and indicating system, as defined in claim 1, comprising:
   a first visual indication means indicative of the completion of at least one of said plurality of voice responsive channel electrical circuits.

3. A noise level monitoring and indicating system, as defined in claim 2, comprising:
   a second visual indicating means indicative of the completion of said area voice responsive channel electrical circuit.

4. A noise level monitoring and indicating system, as defined in claim 3, comprising:
   a third visual indication means responsive to the condition of said first and second visual indication means for providing an indication when both said first and second indication means are extinguished.

5. A noise level monitoring and indicating system, as defined in claim 1, comprising:
   a monitor audio amplifier; and
   a selector switch means for selectively connecting said monitor audio amplifier to the outputs of said plurality of voice responsive channel amplifiers and said area voice responsive channel amplifier.

6. A noise level monitoring and indicating system, as defined in claim 5, comprising:
   a decibel meter responsive to an output of said monitor audio amplifier.

7. A noise level monitoring and indicating system, as defined in claim 5, comprising:
   a monitor speaker driven by said monitor audio amplifier.

8. A noise level monitoring and indicating system, as defined in claim 1, wherein said plurality of voice responsive channel audio amplifiers and said area voice responsive channel audio amplifier each comprise:
   an input means;
   a preamplifier driven by said input means;
   a potentiometer means for controlling the gain of said preamplifier;
   a relay amplifier driven by said preamplifier;
   a relay energized by said relay amplifier, including contact points for completing said electrical circuit;
   an RC circuit including means to adjust the time constant thereof for cutting off said relay amplifier after predetermined increments of conduction time of said relay amplifier; and
   an output means coupled to the output of said preamplifier.

9. A noise level monitoring and indicating system, as defined in claim 8, wherein said display counters include an activating solenoid responsive to said relay of said associated voice responsive channel.

* * * * *